United States Patent
Yoshida et al.

(10) Patent No.: US 6,500,561 B1
(45) Date of Patent: *Dec. 31, 2002

(54) AUTOMOBILE WEATHERSTRIPPING

(75) Inventors: Toru Yoshida, Nagoya (JP); Masayoshi Ichikawa, Ichinomiya (JP); Masanori Aritake, Ichinomiya (JP); Hironobu Shigematsu, Ichihara (JP); Hiroshi Ooyama, Ichihara (JP); Tatsuo Hamanaka, Ichihara (JP)

(73) Assignees: Toyoda Gosei Co., Ltd., Aichi-ken (JP); Sumitomo Chemical Company, Limited, Osaka-fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 141 days.

(21) Appl. No.: 09/046,513

(22) Filed: Mar. 24, 1998

(30) Foreign Application Priority Data

Mar. 27, 1997 (JP) ............................................ 9-075706
Mar. 13, 1998 (JP) ........................................... 10-063373

(51) Int. Cl.$^7$ .......................... B32B 25/04; B32B 9/04; B32B 27/08
(52) U.S. Cl. ....................... 428/492; 428/497; 428/516; 428/517
(58) Field of Search ............................ 524/505; 525/95, 525/98; 428/992, 497, 515, 516, 519, 517; 49/479.1, 483.1, 495.1, 498.1, 440, 441, 475.1, 490.1

(56) References Cited

U.S. PATENT DOCUMENTS

| | | | | |
|---|---|---|---|---|
| 4,745,149 A | * | 5/1988 | Eisele et al. | 524/505 |
| 4,923,759 A | * | 5/1990 | Brooks et al. | 428/521 |
| 5,183,613 A | * | 2/1993 | Edwards | 264/171 |
| 5,187,224 A | * | 2/1993 | Hamanaka et al. | 524/484 |
| 5,216,074 A | * | 6/1993 | Imai et al. | 525/66 |
| 5,258,157 A | * | 11/1993 | Nozaki et al. | 264/261 |
| 5,269,101 A | * | 12/1993 | Nozaki et al. | 49/479.1 |
| 5,314,752 A | * | 5/1994 | Bova et al. | 428/424.2 |
| 5,596,042 A | * | 1/1997 | Itoh et al. | 525/98 |
| 5,635,274 A | * | 6/1997 | Chihara et al. | 428/122 |
| 5,428,079 A | * | 7/1997 | Bastiaansen et al. | 522/161 |
| 5,643,511 A | * | 7/1997 | Pluyter et al. | 264/41 |
| 5,728,744 A | * | 3/1998 | Okada et al. | 521/95 |
| 5,746,867 A | * | 5/1998 | Chihara et al. | 156/242 |
| 5,786,403 A | * | 7/1998 | Okada et al. | 521/134 |
| 5,801,209 A | * | 9/1998 | Chung et al. | 427/207.1 |
| 5,858,502 A | * | 1/1999 | Tanaka | 428/119 |
| 5,936,037 A | * | 8/1999 | Tasaka | 525/92 B |
| 6,237,287 B1 | * | 5/2001 | Nakagawa et al. | 49/479.1 |

FOREIGN PATENT DOCUMENTS

| | | |
|---|---|---|
| JP | 59-159329 | 9/1984 |
| JP | 61-148012 | 7/1986 |
| JP | 8-34076 | 2/1996 |
| JP | 8-269259 | 10/1996 |
| JP | 9-40814 | 2/1997 |

OTHER PUBLICATIONS

"Synthetic Rubber Division Product List" http://www.zeon.co.jp/english/jigyou/f/f–gom–ge1.html.*

* cited by examiner

Primary Examiner—Paul Thibodeau
Assistant Examiner—Kevin R Kruer
(74) Attorney, Agent, or Firm—Pillsbury Winthrop LLP

(57) ABSTRACT

An automobile weatherstripping includes an extrusion-formed part and a mold-formed part, the mold-formed part being welded and integrated with the extrusion-formed part. The extrusion-formed part is made of an olefin elastomer and the mold-formed part is made of a resin composition containing an olefin resin, ethylene-α-olefin copolymer rubber, hydrogenated aromatic vinyl conjugated diene compounds block copolymer mineral oil and at least one of natural rubber and butadiene rubber in predetermined proportions. The extrusion-formed part and the mold-formed part have a sufficient level of bonding strength with no bonding agent layer being used therebetween.

7 Claims, 2 Drawing Sheets

AUTOMOBILE WEATHERSTRIPPING

CROSS-REFERENCE TO RELATED APPLICATION

This application is related to and claims priority under 35 U.S.C. §119 from Japanese Patent Application Nos. Hei 9-07506 and Hei 10-063373, incorporated herein by reference.

BACKGROUND OF THE INVENTION

1. FIELD OF THE INVENTION

The present invention relates to automobile weatherstripping which includes an extrusion-formed part and a mold-formed part and in which the mold formed part is welded and integrated with the extrusion-formed part.

An olefin elastomer which is represented by ethylene propylene non-conjugated diene rubber (EPDM) has a small specific gravity and contains substantially no unsaturated bonds. Therefore, it is easy to satisfy a demand for a reduction in weight and an increase in weather resistance. For this reason, it has hitherto been widely used as a forming material of automobile weatherstripping (referred to simply as "weatherstripping" hereinafter).

The weatherstripping was conventionally manufactured, for example, by cutting an extrusion vulcanized formation consisting of an EPDM rubber blend, setting the resulting material with respect to a mold from one side, both sides, or multiple sides, and injecting the rubber formed material into a cavity to thereby perform vulcanization mold forming.

On the other hand, it has been considered to use, as material for use in this mold forming, nonpolar thermoplastic polyolefin- or styrene-based elastomer or the like necessitating no vulcanization step in place of the EPDM from the viewpoint of productivity (see, e.g., Japanese Patent Laid-Open Publication No. Sho 59-159329).

However, in general, it is difficult to obtain a practical bonding strength between the extrusion-formed part, which is an EPDM vulcanized formation, and the thermoplastic elastomer (hereinafter referred to as "TPE") mold-formed part. Therefore, it is necessary to interpose a bonding agent layer between the extrusion-formed part and the mold-formed part and, therefore, the use of such an elastomer is still difficult to use to satisfy the demand for enhanced productivity.

SUMMARY OF THE INVENTION

In view of the above problems of the prior art, it is an object of the present invention to provide automobile weatherstripping which has a sufficient level of bonding strength between the extrusion-formed part an the mold-formed part even with no bonding agent layer interposed therebetween.

To attain the above object, according to the present invention, automobile weatherstripping has an extrusion-formed part and a mold-formed part, the mold-formed part being welded and integrated with the extrusion-formed part, where the extrusion-formed part is made of an olefin elastomer and the mold-formed part is made of a resin composition containing the following components (A) to (E) below (provided, however, that the sum total of (A) to (E) is 100 parts by weight).

(A) an olefin resin of 5 to 50 parts by weight;
(B) an ethylene-α-olefin copolymer rubber 5 to 86 parts by weight;
(C) a hydrogenated aromatic vinyl conjugated diene compound block copolymer of 2 to 30 parts by weight;
(D) at least one component selected from the group consisting of natural rubber, isoprene rubber and butadiene rubber of 2 to 40 parts by weight; and
(E) a mineral oil of 5 to 80 parts by weight.

As will be supported by examples as described later, the weatherstripping according to the present invention enables the procurement of a sufficient level of bonding strength between the extrusion-formed part and the mold-formed part even with no bonding agent layer being interposed therebetween. Accordingly, in the present invention, it becomes possible to manufacture the weatherstripping with high productivity.

Also, the weatherstripping of the present invention has excellent follow-up flexibility, sealing properties and mechanical strength at the portion of a corner (mold-formed part) of, for example, weatherstripping a door. Accordingly, the weatherstripping of the present invention is excellent in terms of the performance of the mold-formed part.

BRIEF DESCRIPTION OF THE DRAWINGS

The accompanying drawings illustrate preferred embodiments of the present invention. In the drawings.

DESCRIPTION OF THE PREFERRED EMBODIMENTS

The detailed construction of the present invention will now be explained. In the following explanation, the "parts" which represent the blending unit mean "parts by weight" unless otherwise noted.

(1) An automobile weatherstripping according to the present invention generically includes an extrusion-formed part and a mold-formed part, the mold-formed part being welded and integrated with the extrusion-formed part, the extrusion-formed part being made of an olefin elastomer.

Figure 1:
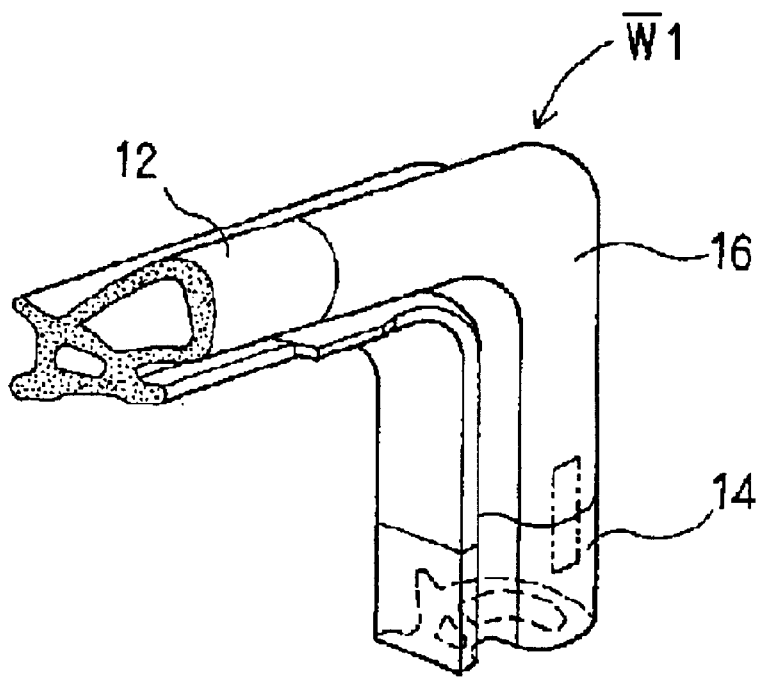
FIG. 1 is a perspective view, partly cut away, of a corner portion of a door weatherstripping according to a preferred embodiment of the present invention.
Figure 2:
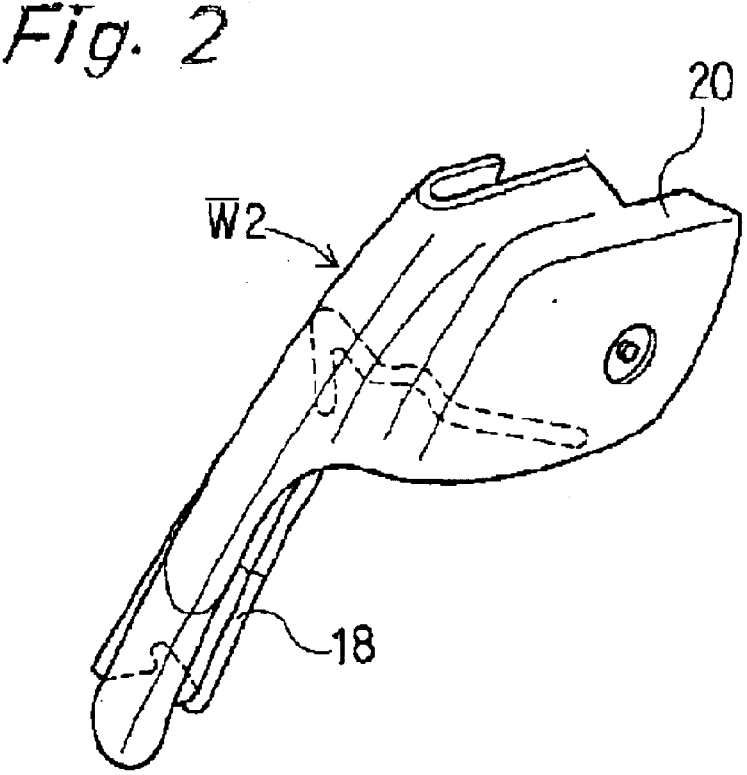
FIG. 2 is a perspective view, partly cut away, of a terminal portion of the door weatherstripping.

As an example of the weatherstripping to which the invention is applicable, a door weatherstripping W1 as illustrated in FIG. 1 has a corner-formed part (mold-formed part) 16 connected to two extrusion-formed parts 12 and 14 and weatherstripping a door W2 as illustrated in FIG. 2, and a terminal formed part 20 has been formed connected to an extrusion-formed part 18. Of course, the present invention is also applicable to various weatherstrippings for a roof side portion, weatherstripping for a sliding roof panel, and also to door opening trim, a glass run, etc.

As concrete examples of the olefin elastomer there can be taken a vulcanizable (crosslinkable) rubber and a TPE for which no vulcanization is needed.

As the vulcanizable rubber, ethylene-α-olefin copolymer rubber elastomer and ethylene-α-olefin-non-conjugated diene copolymer rubber can be used. As the -α-olefin, for example, propylene, 1-butene, 1-pentene, 1-hexene, 4-methyl-1-pentene, 1-octoctene, or 1-decene may be used. Among these, propylene is preferable. Also, as the non-conjugated diene, for example, 5-ethyleidene-2-norbornene (ENB), 1,4-hexadiene or dicyclopentadiene can be used.

The TPE is what is called "an olefin-based thermoplastic elastomer" and consists of an olefin resin such as polyethylene, polypropylene, polybutene and copolymers thereof.

As a concrete example of the ethylene-α-olefin copolymer rubber there can be cited ethylene-α-olefin copolymer rubber or ethylene-α-olefin-non-conjugated diede copolymer rubber and, as the a-olefin and non-conjugated diene, there can be used what has been stated in connection with the above-described vulcanizable rubber.

The ethylene-α-olefin copolymer rubber in the olefin-based thermoplastic elastomer can be made in a non-crosslinked state or in a crosslinked, for example, partly crosslinked or fully crosslinked, state. However, the partial or full crosslinkage is preferable from the viewpoint of compression set.

(2) The characterizing feature of the weatherstripping according to the present invention is that the mold-formed part is formed using a resin composition containing the following items (A) to (E) (provided, however, that the sum of the total of (A) to (E) is 100 parts).

<(A) Component: Olefin Resin>

Polypropylene or a copolymer of polypropylene or pro-pylene and -α-olefin having two or more carbon atoms per molecule other than propylene is preferable. Specific examples of the α-olefin include ethylene, 1-butene, 1-pentene, 3-methyl-1-butene, 1-hexene, 1-decene, 3-methyl-1-pentene, 4-methyl-1-petene, 1-octene and the like. The melt flow rate (MFR) of the olefin resin is usually 0.1 to 100 g/10 min. and preferably in a range of from 0.5 to 50 g/10 min. Here, the "MFR" represents the weight (g) of the thermoplastic resin extruded for 10 minutes from an orifice having a diameter of 2.1 mm and a length of 8 mm under a load of 2.16 kgf (21.1 8N) at a temperature of 230° C. according to JIS (Japan Industrial Standard) K7210.

<(B) Component: Ethylene-α-olefin Copolymer Rubber>

As the (B) component, there can be used an ethylene-α-olefin copolymer rubber and ethylene-α-olefin-non-conjugated diene copolymer rubber.

As the α-olefin, for example, propylene, 1-butene, 1-pentene, 1-hexene, 4-methyl-1-pentene 1-octene, or 1-decene can be used. Among others, propylene is preferable. Also, as the non-conjugated diene, for example, 1,4-hexadine, dicyclopentadiene or 5-ethyleidene-2-norbornene can be used.

The ratio (weight ratio) of ethylene/ α-olefin of this component is usually 90/10 to 30/70. The content of the non-conjugated diene in the case of using the ethylene-α-olefin-non-conjugated diene copolymer rubber is usually 5 to 40 in terms of the iodine value. It is to be noted that the ethylene-α-olefin copolymer rubber and the ethylene-α-olefin-non-conjugated diene copolymer rubber may be used in a mixed form. It is also to be noted that either oil-extended rubber or non-oil-extended rubber may be used. It is also to be noted that the content of the extender oil in the case of using the oil-extended rubber is usually 20 to 200 parts per 100 parts of the copolymer rubber.

As the ethylene-α-olefin copolymer rubber, a copolymer in which the blend weight ratios of ethylene and propylene are 85/15 to 45/55. The Mooney viscosity at 100° C. ($ML_{1+4}$ 100° C.) of the ethylene-α-olefin copolymer rubber is preferably 10 to 350 and is more preferably 30 to 300. When the Mooney viscosity is too small, the mechanical strength sometimes becomes inferior. On the other hand, when the Mooney viscosity is too large, the appearance of the formed part is sometimes impaired.

The ethylene-α-olefin copolymer rubber in the olefin-based thermoplastic elastomer can be made even in a noncrosslinked state. However, it is preferable that it be made in a partly or fully crosslinked state from the viewpoint of compression set.

<(C) Component: Hydrogenated Aromatic Vinyl Conjugated Diene Compound Block Copolymer>

As the aromatic vinyl, for example, styrene, α-methylstyrene, tertiary butylstyrene, p-methylstyrene or m-methyl styrene can be used. However, styrene is preferable.

As the conjugated diene, for example, butadiene, isoprene, 1,3-pentadiene, or 2,3-dimethyl-1,3-butadiene can be used. Butadiene and isoprene are preferable.

Preferably, the number-average molecular weight of this copolymer is approximately 150,000 or more. When the number-average molecular weight is too small, the value of the compression set in some cases becomes large.

Also, the hydrogenation degree is preferably 50% or more, further preferably 80% and more preferably 95% or more. When the hydrogenation degree is too small, the weather resistance and the thermal aging resistance sometimes become inferior. It is to be noted that the hydrogenation degree means the proportion of the of the ethylene double bonds hydrogenated to the total ethylene double bonds.

A commercially-available product can be used for this component.

<(D) Component: At Least One Component Selected from the Group Consisting of Natural Rubber, Isoprene Rubber and Butadiene Rubber>

As natural rubber there can be cited, for example, ribbed smoked sheets, white crepes, pale crepes, estate brown crepes, compo crepes, blanket crepes or flat bark may be used. Among these, white crepes and pale crepes are preferable.

The type of isoprene rubber is not particularly limited if it is produced on an industrial basis. However, an isoprene rubber having a cis content of 80% or more and a Mooney viscosity ($ML_{,1+4}$ 100° C.) of 30 or more is preferable.

The type of butadiene rubber is not particularly limited, either. However, usually a commercially available low-cis-butadiene rubber having a cis content of 40% or less or high-cis-butadiene rubber having a cis content of 80% or more is favorably used. Butadiene rubber having a Mooney viscosity ($ML_{1+4}$ 100° C.) of 20 or more is preferable.

<(E) Component: Mineral Oil>

Aromatic, naphthenic or paraffinic mineral oil which is usually compounded in rubber can be used. Among others, paraffinic mineral oil is preferable.

The amounts of the respective components (A) to (E) are usually 5 to 50 parts (A), 5 to 86 parts (B), 2 to 30 parts (C), 2 to 40 parts (D), and 5 to 80 parts (E) (provided, however, that the sum total of the (A) to (E) components is assumed to be 100 parts). It is to be noted that the quantity of the component (B) in the case where the oil-extended rubber is used is one measured based on the quantity of only the polymer component containing no extender oil.

When the amount of the component (A) is too small, the flowability deteriorates with the result that the appearance sometimes becomes defective. On the other hand, when the amount of the component (A) is too large, the resulting resin composition becomes hard and sometimes exhibits low elasticity. When the amount of the component (B) is too small, the resulting resin composition sometimes exhibits no elasticity. On the other hand, when the amount of the component (B) is too large, the flowability deteriorates with the result that the outer appearance sometimes becomes defective. When the amount of the component (C) is too small, the flexibility sometimes deteriorates and the strength sometimes decreases. On the other hand, when the amount of the component (C) is too large, the heat resistance sometimes becomes inferior. When the amount of the component (D) is too small, it sometimes happens that no cohesive failure is exhibited when a bond is made. On the other hand, when the amount of the component (D) is too large, the tack property increases with the result that sometimes dust or foreign particles attach to or fix onto the resulting resin composition due to an increase in tackiness. By using component (E) within the above-described range, it is possible to improve the defects of the appearance or decrease the hardness, thereby making the material more flexible. It is to be noted that within each component, the amount of the component in the case where two kind of materials are used in a mixed form is one measured on a basis of the sum total amount thereof.

The resin composition used in the present invention may contain calcium carbonate (F) in addition to the above-mentioned components (A) to (E).

The calcium carbonate (F) is a filler which is compounded into ordinary rubber and plastic. As the examples thereof, for example, precipitated calcium carbonate represented by light calcium carbonate and very fine particle size calcium carbonate, and ground calcium carbonate may be used. Also, the calcium carbonate includes those which have been surface treated by various organic substances. The preferable content of component (F) is 2 to 50 parts per 100 parts of the total of the components (A) to (E). By using component (F) within the above-described range, it is possible to obtain a lower cost material without impairing the flexibility, strength and flowability thereof.

In order to obtain the resin composition used in the present invention, the components (B), (C) and (D) are kneaded together by the use of, for example, a Banbury mixer and, further, the components (A) and (E) and, if necessary, the component (F), are added to the kneaded material, after which the resulting material is melted and kneaded.

As the resin composition used in the present invention, a crosslinked resin composition obtained by performing dynamic crosslinking of the corresponding resin composition by the use of an organic peroxide is preferable. As the organic peroxide there can be used, for example, a dialkylperoxide. It is to be noted that there may be used, if necessary, for example, inorganic fillers such as talc, additives such as flame retarders, lubricants, antistatic agents, anti-oxidants, light stabilizers, ultraviolet ray absorbers or mold release agents, or pigments.

With regard to the weatherstripping of the present invention, in cases where follow-up flexibility and sealing capability are demanded at the portion of a corner of, for example, the door weatherstripping, it is preferable that the mold-formed part is made of a crosslinked resin composition which provides a Shore A hardness (as measured in accordance with ASTM D2240 and hereinafter also measured in the same way) of 30 to 50 or preferably 35 to 45 as described below. When the Shore A hardness is 30 to 50, the amounts of the respective components are 5 to 15 parts (A), 5 to 50 parts (B), 2 to 20 parts (C), 2 to 20 parts (D), 20 to 80 parts (provided, however, the sum total of (A) to (E) is assumed to be 100 parts) and 2 to 20 parts (F) per 100 parts of the components (A) to (E). When the Shore A hardness is 35 to 45, the amounts of content of the respective components are 8 to 12 parts (A), 10 to 40 parts (B), 2 to 10 parts (C), 2 to 10 parts (D), 40 to 80 parts (provided, however, the total of the components (A) to (E) is assumed to be 100 parts) and 2 to 10 parts (F) per of 100 parts of the components (A) to (E).

(3) The weatherstripping of the present invention is manufactured by cutting an extruded formation consisting of an olefin elastomer, setting the resulting material with respect to a mold from one side, both sides, or multiple sides, and injecting the specified resin composition into a cavity having been formed to thereby perform mold forming in the same way as stated previously. At this time, it is preferable that as the injection molding condition the cylinder temperature is 200 to 260° C. and the mold temperature is 20 to 80° C.

The mold-formed part of the weatherstripping that has been formed as mentioned above is thermally welded with an end surface of the extrusion-formed part, whereby it is possible to obtain a practical bonding strength as illustrated in examples as later described.

EXAMPLES

Description will now be made of a number of non-limiting examples and comparative examples in which tests were conducted to ascertain the advantages of the present invention.

A. Indirect Evaluation (1) Preparation of Test Specimens

The blends prepared by respective formulations shown in Tables [1] to [3] were each kneaded using the Banbury mixer and, further, a crosslinking agent and a crosslink aid were added to the kneaded material and then kneaded. Then, the resulting kneaded material was dynamically crosslinked to prepare a resin composition.

(2) Physical Properties Test

Each resin composition was subjected to injection molding under the conditions that the injection cylinder temperature was 220° C. and the mold temperature was 50° C. to obtain a sheet of 2 mm thickness.

By punching out the sheets, test specimens were prepared and physical properties tests under the items below were conducted thereon.

<1>Hardness Test: The Shore A hardness was measured in accordance with ASTM D 2240.

<2>Tension Test: The breaking strength ($T_S$) and elongation ($E_S$) were determined in accordance with JIS K 6301 by the use of a No. 3 dumbbell specimen under the condition that the tensile speed is 200 mm/min.

<3>Tear Test: The tear strength ($T_S$) was determined in accordance with JIS K 6301 by the use of a B-type test specimen under the condition that the tensile speed is 200 mm/min.

(3) Bond Test

The EPDM blend prepared by the following blending formulation was kneaded using an 8-inch roll and was then extruded using a uniaxial extruder of 20 mm at a temperature of 80° C. to obtain belt-shaped extruded material having sectional dimensions of 30 mm×20 mm. This material was vulcanized in an oven of 220° C. for 10 minutes and then the resulting mass was cut to pieces of 7 cm each which were used as vulcanized rubber pieces (a).

| EPDM BLENDING FORMULATION | |
|---|---|
| EPDM polymer* | 100 parts |
| FEF carbon | 180 parts |
| Process Oil | 90 parts |
| Calcium Carbonate | 10 parts |
| Zinc White | 5 parts |
| Dehydrating Agent (CaO) | 5 parts |
| Processing Aid | 5 parts |

-continued

| EPDM BLENDING FORMULATION | |
|---|---|
| Sulfur | 0.8 parts |
| Vulcanization Promotor | 4.6 parts |

*weight-average molecular weight: about 450,000 ethylene content: 67% wt % ENB content: 7 wt %

The above described vulcanized rubber pieces (a) were set to a mold and the above-described respective resin compositions (b) were injection molded to thereby prepare composite molded formations wherein (a) and (b) were bonded together by insert molding.

This molding was conducted with the injection cylinder temperature at 220° C. and the mold temperature at 50° C.

Figure 3:
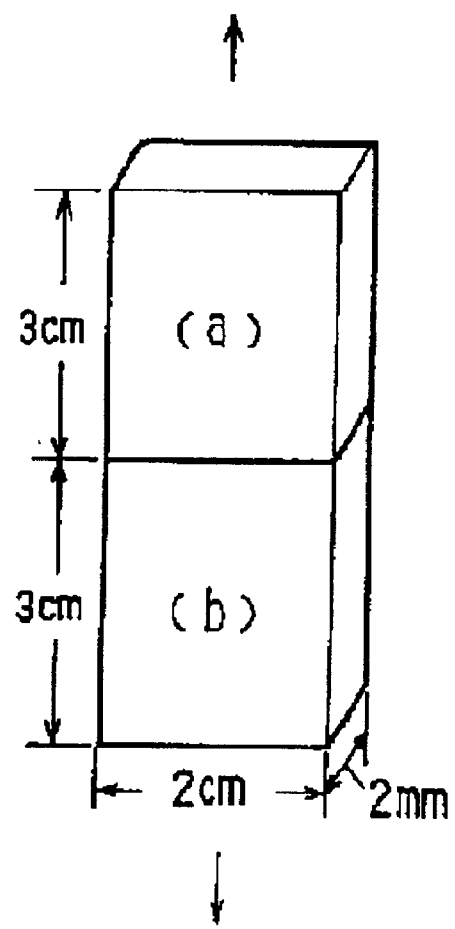
FIG. 3 is a model diagram illustrating a testing method for conducting bonding test intended for making an indirect evaluation of the present invention.

Each of the composite molded formings thus prepared was punched out into a strip of 2 cm×6 cm as illustrated in FIG. 3 to prepare a test piece. Each test piece was pulled with a tensile speed of 200 mm/min and the bonding strength of a bonding interface between (a) and (b) was evaluated.

(4) Test Results and Evaluation

The test results are shown in Tables [1] to [3]. All of Examples 1 to 6 satisfying the conditions of the present invention exhibit satisfactory physical properties and bonding strength. On the other hand, Comparative Examples 1 to 6 in which the components (C) and (D) were not used are each inferior in their physical properties and the bonding strength.

B. Direct Evaluation (1) Preparation of Test Specimens

First, the EPDM blend that has been prepared by the following blending formulation was kneaded using a kneader to prepare material for use in extrusion formation. Thereafter, using this material, an extrusion formation having a section illustrated in FIG. 1 was extruded. Then, the extrusion formation was vulcanized by microwave vulcanization (UHF) (output: 5 kw×0.5 min) and heated air vulcanization (HAV) (220° C.×3 min.) to prepare a foamed extrusion formation.

| FOAMED EPDM BLENDING FORMULATION | |
|---|---|
| EPDM polymer* | 120 parts |
| MAF carbon | 120 parts |
| Process Oil | 90 parts |
| Calcium Carbonate | 10 parts |
| Zinc White | 7 parts |
| Dehydrating Agent | 5 parts |
| Processing Aid | 3.5 parts |
| Sulfur | 1.3 parts |
| Vulcanization Promotor | 6.3 parts |
| Foaming Agent | 4.0 parts |

*rubber (containing 20 parts of process oil), weight-average molecular weight: about 500,000 ethylene content: 60 wt % ENB content: 10 wt %

This foamed extrusion formation (specific gravity: 0.55) was cut and set to a mold. Thereafter, respective resin compositions of Example 1 and Comparative Example 1 that were prepared in the same way as stated previously were injection molded to mold-form the corner portion illustrated in FIG. 1. The molding was conducted with the injection cylinder temperature at 220° C. and the mold temperature at 50° C.

(3) Testing Method

With regard to the respective weatherstrippings thus prepared, the tests under the items below were conducted thereon.

<(1)Bond Test>:

From the connection portions (the two-dotted chain line indicated portion in FIG. 1: thickness approximately 2 cm) of the respective weatherstrippings, strip pieces each 10 mm wide were cut and sampled to prepare test pieces. Each test piece was measured at normal temperatures by using a tensile tester (tensile speed: 200 mm/min).

<(2) Compression Load Test>:

The load when the hollow portion of the mold-formed part of the weatherstripping was compressed 6 mm in the heightwise direction was measured using a compression tester (compression speed: 20 mm/min). The load value is converted in terms of the value per 100 mm length of the weatherstripping.

<4> With regard to the test results, the compression loads were 8 N/100 mm and exhibited no change, but the bonding strengths were 1.5 Mpa in the case of Example 1 and 0.8 Mpa in the case of Comparative Example 1. These data show that a sufficient level of practical strength was attained in the case of Example 1.

TABLE 1

| | E-1* | E-2* | CE2* | CE-2* | CE-3* |
|---|---|---|---|---|---|
| Blend (Weight Part) | | | | | |
| (A) PP | 10.6 | 10.6 | 10.6 | 10.6 | 10.6 |
| (B) Oil-Extended EPDM | 44.0 | 41.5 | 51.5 | 46.5 | 46.5 |
| (C) NR | 2.5 | 5.0 | 0 | 5.0 | 0 |
| (D) SEBS | 5.0 | 5.0 | 0 | 0 | 5.0 |
| (E) Mineral Oil | 37.9 | 37.9 | 37.9 | 37.9 | 37.9 |
| (F) Calcium Carbonate | 5.0 | 5.0 | 5.0 | 5.0 | 5.0 |
| Crosslinking Aid | 0.8 | 0.8 | 0.8 | 0.8 | 0.8 |
| Crosslinking Agent | .32 | 0.32 | 0.32 | 0.32 | 0.32 |
| Hardness (Shore A) | 42 | 42 | 40 | 35 | 40 |
| $T_B$ | | | | | |
| (kgf/cm$^2$) | 27 | 31 | 16 | 22 | 31 |
| (N/mm) | 2.65 | 3.04 | 1.57 | 2.16 | 3.04 |
| $E_B$ (%) | 520 | 380 | 350 | 390 | 490 |
| $T_R$ | | | | | |
| (kgf/cm) | 12 | 12 | 7 | 9 | 12 |
| (N/mm) | 1176 | 1176 | 686 | 882 | 1176 |
| Bonding Strength | | | | | |
| (kgf/cm$^2$) | 14 | 18 | 4 | 6 | 9 |
| (Mpa) | 1.37 | 1.76 | 0.39 | 0.59 | 0.88 |

Labels in Table 1 are explained below.

(E-1, E-2, CE-1, CE-2, CE-3: Example-1, Example 2, Comparative Example 1, Comparative Example 2, and Comparative Example 3).

PP: polypropylene (melt flow rate-0.7)

Oil-Extended

EPDM: ethylene-propylene-5 -ethylidene-2-norbornene copolymer rubber (ethylene/propylene weight ratio= 72/28, iodine value=20, ML$_{1+4}$ 100° C.=53, oil-extended amount=100parts by weight per 100 parts by weight of EPDM).

NR: natural rubber (Pale Crepes)

SEBS: hydrogenated styrene-butadiene block copolymer (number-average molecular weight=174,000, styrene content=33 wt.%, hydrogenation degree =99.9%).

Mineral Oil: paraffine process oil

Calcium Carbonate: ground calcium carbonate.

Crosslinking Aid: Sumifine BM (produced by Sumitomo Chemical Co. Ltd.).

Crosslinking Agent: Sunperox YPO (produced by Sanke Kako Limited.).

TABLE 2

|  | E-3* | E-4* | E5* | CE-4* | CE-5* |
|---|---|---|---|---|---|
| Blend (Weight Part) | | | | | |
| (A) PP | 10.6 | 10.6 | 10.6 | 10.6 | 10.6 |
| (B) Oil-Extended EPDM | 41.0 | 44.5 | 41.5 | 46.5 | 46.5 |
| (C) IR | 5.0 | 0 | 0 | 5.0 | 0 |
| (C) BR | 0 | 2.5 | 5.0 | 0 | 5.0 |
| (D) SEBS | 5.0 | 5.0 | 5.0 | 0 | 0 |
| (E) Mineral Oil | 37.9 | 37.9 | 37.9 | 37.9 | 37.9 |
| (F) Calcium Carbonate | 5.0 | 5.0 | 5.0 | 5.0 | 5.0 |
| Crosslinking Aid | 0.8 | 0.8 | 0.8 | 0.8 | 0.8 |
| Crosslinking Agent | 0.32 | 0.32 | 0.32 | 0.32 | 0.32 |
| Hardness (Shore A) | 40 | 41 | 41 | 38 | 40 |
| $T_B$ | | | | | |
| (kgf/cm$^2$) | 25 | 28 | 31 | 20 | 24 |
| (N/mm) | 2.45 | 2.74 | 3.04 | 1.96 | 2.35 |
| $E_B$ (%) | 420 | 480 | 400 | 380 | 350 |
| $T_R$ | | | | | |
| (kgf/cm) | 12 | 12 | 12 | 10 | 11 |
| (N/mm) | 1176 | 1176 | 1176 | 980 | 1078 |
| Bonding Strength | | | | | |
| (kgf/cm$^2$) | 14 | 16 | 20 | 6 | 9 |
| (Mpa) | 1.37 | 1.57 | 1.95 | 0.59 | 0.88 |

Labels in Table 2 are explained below.

(E-3, E-4, E-5, CE-4, and CE-5: Example 3, Example 4, Example 5, Comparative Example 4, and Comparative Example 5).

IR: isoprene rubber [Nipol IR2205] (produced by Nippon Zeon Co. Ltd.).

BR: butadiene rubber [Nipol BR1241]) (produced by Nippon Zeon Co. Ltd).

Other items are the same as those in Table [1]

|  | E-6* | CE-6* |
|---|---|---|
| Blend (Weight Part) | | |
| (A) PP | 40.0 | 40.0 |
| (B) Oil-Extended EPDM | 38.0 | 40.3 |
| (C) NR | 2.3 | 0 |
| (D) SEBS | 4.0 | 4.0 |
| (E) Mineral Oil | 15.3 | 15.3 |
| (F) Calcium Carbonate | 0 | 0 |
| Crosslinking Aid | 0.4 | 0.4 |
| Crosslinking Agent | 0.32 | 0.32 |
| Hardness (Shore A) | 85 | 88 |
| $T_B$ | | |
| (kgf/cm$^2$) | 100 | 82 |
| (N/mm) | 9.80 | 8.04 |
| $E_B$ (%) | 620 | 600 |
| $T_R$ | | |
| (kgf/cm) | 43 | 35 |
| (N/mm) | 4214 | 3430 |
| Bonding Strength | | |
| (kgf/cm$^2$) | 49 | 36 |
| (Mpa) | 4.80 | 3.53 |

Labels in Table 3 are explained below.

(E6 and CE-6: Example 6 and Comparative Example 6).

PP: polypropylene (melt flow rate=8, ethylene content= 4.8 wt.%).

Other items are the same as those in Table [2].

The above examples are presented for purposes of illustration only, and variations thereon will of course be readily apparent to those skilled in the art, which are encompassed by the appended claims.

What is claimed is:

1. An automobile weatherstripping comprising a curable extrusion-formed part and a curable mold-formed part, the mold-formed part being welded and integrated with the extrusion-formed part following cure of the extruded part, wherein the extrusion-formed part is made of an ethylene-α-olefin-non-conjugated diene copolymer rubber and the mold-formed part is made of a resin composition containing the following components (A) to (E), the sum total of all components (A) to (E) being 100 parts by weight:

(A) 5 to 15 parts by weight of an olefin resin;

(B) 5 to 50 parts by weight of an ethylene-α-olefin-non-conjugated diene copolymer rubber;

(C) 2 to 20 parts by weight of a hydrogenated aromatic vinyl conjugated diene compound block copolymer;

(D) 2 to 20 parts by weight of at least one compound selected from the group consisting of natural rubber, isoprene rubber and butadiene rubber; and (E) 20 to 80 parts by weight of mineral oil wherein the mold-formed part has a Shore A hardness (as measured in accordance with ASTM D 2240) in a range of from 30 to 50.

2. An automobile weatherstripping as set forth in claim 1, wherein the extrusion-formed part is made of EPDM.

3. An automobile weatherstripping as set forth in claim 1, wherein the resin composition is subjected to dynamic crosslink by an organic peroxide.

4. An automobile weatherstripping as set forth in claim 1, wherein the number-average molecular weight of the component (C) is at least about 150,000.

5. An automobile weatherstripping as set forth in claim 1, wherein the hydrogenation degree of component (C) is at least about 50%.

6. An automobile weatherstripping as set forth in claim 1, wherein the component (B) is EPDM.

7. The automobile stripping of claim 1, wherein said curable mold-formed part has a first end and a second end;

said weatherstripping comprises two of said extrusion-formed parts;

one of the two extrusion-formed parts is welded and integrated with said first end;

and the other of the two extrusion-formed parts is welded and integrated with said

* * * * *